United States Patent

[11] 3,582,944

[72] Inventor Toshio Kashio
Kodaira, Japan
[21] Appl. No. 748,800
[22] Filed July 30, 1968
[45] Patented June 1, 1971
[73] Assignee Casio Computer Co., Ltd.
Tokyo, Japan
[32] Priority Aug. 11, 1967
[33] Japan
[31] 42/51,188

[54] INDICATING SYSTEM OF 4-BIT CODED SIGNAL
4 Claims, 1 Drawing Fig.

[52] U.S. Cl. .......... 340/347, 235/92, 315/84.6, 340/204, 340/212, 340/324, 340/336, 340/343
[51] Int. Cl. .......... G06f 5/02, G09f 9/00
[50] Field of Search .......... 235/154, 92 (63), 155, 92 (6,15); 315/84.6; 340/324, 347, 378, 204, 212, 325, 336, 379

[56] References Cited

UNITED STATES PATENTS

| | | | |
|---|---|---|---|
| 3,147,469 | 9/1964 | Buchsbaum .......... | 340/336 |
| 3,204,234 | 8/1965 | Nakauchi .......... | 340/336 |
| 2,664,555 | 12/1953 | Thomas et al. .......... | 315/84.6X |
| 2,814,001 | 11/1957 | Maynard .......... | 315/84.6 |
| 2,828,468 | 3/1958 | Ball et al. .......... | 235/92X |
| 3,062,441 | 11/1962 | Martin .......... | 235/92 |
| 3,168,677 | 2/1965 | Somlyody .......... | 315/84.6X |

*Primary Examiner*—Maynard R. Wilbur
*Assistant Examiner*—Michael K. Wolensky
*Attorney*—Sughrue, Rothwell, Mion, Zinn and MacPeak

ABSTRACT: An indicating system of 4-bit coded signal suitable to indicate each of the 16 possible combinations of the 4-bit coded signal by using a normal decimal numeral indicating device having a capacity for the numerical values 0—9 and combining a point indication therewith.

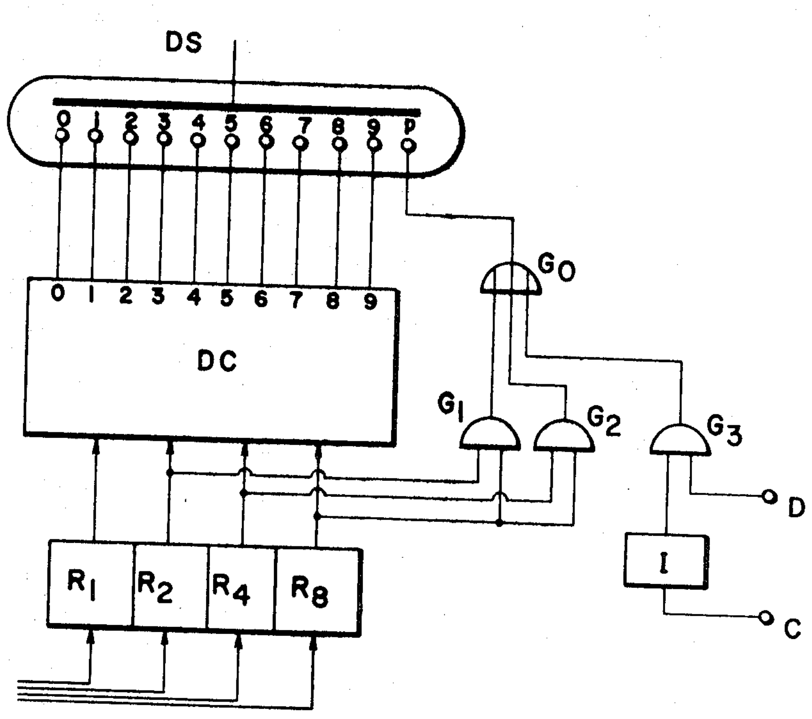
DS
0
1
2
3
4
5
6
7
8
9
P
0
1
2
3
4
5
6
7
8
9
DC
G0
G1
G2
G3
D
I
C
R1
R2
R4
R8

INDICATING SYSTEM OF 4-BIT CODED SIGNAL

The present invention relates to an indicating system of 4-bit coded signals.

It is possible to express 16 kinds of numerical information contents by combining 4-bit coded signals, however, when using a set of normal decimal numeral indicating means, only 10 kinds of the numerical information contents may be indicated. When the information contents obtained by a combination of 4-bit coded signals are utilized in an object which includes not only the decimal numerical values of 0—9, but also includes, for instance, various instruction words, it is desirous in view of economy to effectively utilize the all 16 kinds of the available combination of the coded signals.

The present invention is intended to fully utilize the above 4-bit coded signals not only for the indication of 10 decimal numerals, but for the whole 16 contents. In the indicating system of the invention, a combination of the conventional decimal indicating means with a point indication is effectively introduced, so that to indicate all contents of the 16 kinds of combination.

It is common practice to indicate 16 kinds of information contents by combining 4-bit coded signals while giving each bit with a different weight. Usually, each bit of the 4-bit coded signals is given a weight "8," "4," "2," "1," respectively. By this arrangement the 16 numerical informations corresponding to the numerals 0—15 as indicated in the following Table may be obtained.

CODE TABLE

| 8 | 4 | 2 | 1 | Numerical value | Indication |
|---|---|---|---|---|---|
| 0 | 0 | 0 | 0 | 0 | 0 |
| 0 | 0 | 0 | 1 | 1 | 1 |
| 0 | 0 | 1 | 0 | 2 | 2 |
| 0 | 0 | 1 | 1 | 3 | 3 |
| 0 | 1 | 0 | 0 | 4 | 4 |
| 0 | 1 | 0 | 1 | 5 | 5 |
| 0 | 1 | 1 | 0 | 6 | 6 |
| 0 | 1 | 1 | 1 | 7 | 7 |
| 1 | 0 | 0 | 0 | 8 | 8 |
| 1 | 0 | 0 | 1 | 9 | 9 |
| 1 | 0 | 1 | 0 | 10 | 2. |
| 1 | 0 | 1 | 1 | 11 | 3. |
| 1 | 1 | 0 | 0 | 12 | 4. |
| 1 | 1 | 0 | 1 | 13 | 5. |
| 1 | 1 | 1 | 0 | 14 | 6. |
| 1 | 1 | 1 | 1 | 15 | 7. |

In this case, the numerals 0—9 can be indicated by using general decimal number indicating means, such as, a digit indicating tube, however, the numerals 10—15 cannot be indicated by such conventional decimal number indicating means.

When comparing the codes of the numerals 0—9 of the above code chart with that of the numerals 10—15 of the chart, it is seen that the codes of the numerals 2—7 and that of 10—15 include identical code bits at the positions of weight of "1," "2" and "4." The difference between these two groups of codes is that each code of the numerals 2—7 has bit 0 at each weight position of "8" and each code in the numerals 10—15 has bit 1 at the weight position of "8."

The present invention utilizes the feature of this point. The present invention combines decimal numerals 2—7 with a point indication, such as, 2., 3., ... 7. to indicate the codes of the numerals 10—15.

For a better understanding of the invention reference is taken to the accompanying drawing.

The sole drawing shows a lock diagram of indicating device of 4-bit coded signal according to a preferred embodiment of the invention.

In the drawing, $R_1$, $R_2$, $R_4$ and $R_8$ are the registers, each of which stores 1-bit coded signal. The suffix of the character indicating each register shows the weight of the coded signal stored therein. Namely, register $R_1$ stores a signal having weight "1," register $R_2$ stores a signal having weight "2," $R_4$ stores signal having weight "4" and register $R_8$ stores signal having a weight "8," respectively. DC is a decoding circuit, which converts each coded signal stored in the registers $R_1$—$R_8$, each of which corresponds to one of the above bits in the Table, to a signal corresponding decimal number and delivers an output signal at one of the corresponding output terminals representing the numerals 0—9.

In this case, the decoder circuit DC is designed to utilize the output signals of the 4 registers $R_1$—$R_8$ in the conversion of numerals 0, 1, 8, 9 as indicated in the above Table marked by a square, however, to utilize only three output signals of the three registers $R_1$, $R_2$ and $R_4$ having weight of "1," "2" and "4" in the conversion of numerals "2," "3," "4," "5," "6" and "7."

DS is a numerical value indicating means, such as, decimal indicator tube, which comprises input terminals 0—9 for the indication of signal of numerals 0—9 and an input terminal *p* for the point indicating signal. $G_1$, $G_2$ and $G_3$ are AND gates, $G_0$ is an OR gate and I is an inverter circuit. C is an input terminal of instruction signal according to the invention for the indication of 4-bit coded signal. D is an input terminal of indicating signal of the normal decimal numerals.

Each output terminal of the registers $R_1$—$R_8$ is connected to each one of the input terminals of decoder circuit DC. Each of output terminals 0—9 of the decoder circuit DC is connected to each one of indicator signal input terminals 0—9 of the indicating device DS corresponding to the numerals. Output terminals of the register $R_2$ and $R_8$ are connected to the input terminals of the AND gate circuit $G_1$ and output terminals of register $R_4$ and $R_8$ are connected to input terminals of AND gate circuit $G_2$, respectively. Signal input terminal C is connected via the inverter circuit I to an input circuit of AND gate $G_3$ and signal input terminal D is directly connected to another input terminal of the same AND gate $G_3$. The output terminals of the AND gate circuits $G_1$, $G_2$ and $G_3$ are connected to an input terminal *p* of point indication of the indicating device DS via an OR gate circuit $G_0$.

The operation of the above mentioned indicating device will be described hereinafter.

When a coded signal consists of 4-bit elements is indicated, an instruction signal is applied to the input terminal C. Thus the point indication instruction signal applied to the input terminal D is prohibited by then closed gate circuit $G_3$ by means of an inhibiting output of the inverter circuit I, which is controlled by the supplied indication signal at the input terminal C.

The decoder circuit DC functions the converting operation by means of 4-bit coded signal stored in the registers $R_1$—$R_8$ for the numerical values 0, 1, 8 and 9. However, this decoder circuit DC utilizes 3-bit coded signal stored in the registers $R_1$, $R_2$ and $R_4$ for the numerical values 2—7. As mentioned before each of the 3-bit coded signals for the numerical values 2—7 and that for the numerical values 10—15 are identical with each other as indicated in the Table. Accordingly, the decoder circuit DC delivers same output signals for the numerical values 10—15 with the output signals in the case of numerical values 2—7, so that the numerical values 10—15 are indicated by the same numerals 2—7.

In this case, the discrimination between the original numerical values 2—7 and that of the values 10—15 is effected in the following manner.

The register $R_8$ delivers always signal 1 at the numerical codes 10—15. The register $R_2$ delivers signal 1 at the numerical codes 10 and 11 and the register $R_4$ delivers signal 1 at the numerical codes 12—15. The above combination of bits exists only at the numerical codes 10—15. Therefore, this condition may be detected by means of the AND gates $G_1$ and $G_2$ and a point indication is made in the indicating device additionally with the numerical value indications 2—7 so that the indication for the numerical values 10—15 may be discriminated from that of the numerical values 2—7.

When the 4-bit code is not required to be indicated but only the general decimal numerals or a decimal point are to be indicated, the input terminal C is not supplied the signal input so that the inverter circuit I produces an output signal. The AND gate $G_3$ is supplied at one of the input terminals a conducting output signal from the inverter circuit I and at the other one of the input terminals the decimal point indication signal via the input terminal D so that this gate produces an output signal. This output signal is supplied to the terminal $p$ of the numerical value indicating means DS via the OR gate $G_0$. Thus, the decimal point indication $p$ is effected in the indicating means and the decimal numerals are indicated with a separate indication of the decimal point. In this case, the codes 10—15 are not utilized for the indication of normal numerals. Therefore, the AND gates $G_1$ and $G_2$ do not produce an output signal for the decimal point indication. Accordingly, the decoder circuit DC can be used for the conversion of the general numerical value indication.

As mentioned above, all 16 possible combinations of the 4-bit coded signal can be indicated by an indicating means for the decimal numerals which is additionally provided a point indicating function.

For instance, the 16 conditions of the 4-bit coded signal may be made to correspond to the various controlling instructions, such as ×, ÷, +, −, =, $\sqrt{\ }$, K, C, $M_1$, $F_1$, $M_2$, $F_2$ . . . so that to indicate the instructions by the numerals and a combination of the numerals and a point indication, respectively.

If, only the normal decimal numerals 0—9 are used as in the conventional system, only 10 kinds of the function can be utilized even in a case of application of the system other than the numerical value indication, for instance, such as the various instructions.

Thus, by using the system of the invention, the device can considerably be economized.

More especially, according to the invention, the numerical setting of controlling instructions and programs of a computer may easily be carried out. Accordingly, if the present invention is applied in a field of small type digital operating device such as desk type electronic computers or the like, which may usually be controlled by a person who has not particular knowledge of the programing of the computer, a great advantage may be obtained in that various functions can be added in the device by using a very simple circuit construction.

What I claim is:

1. An indicating system for a 4-bit binary coded signal of 16 possible combinations comprising a. a first, a second, a third and a fourth register means, each of the register means receiving and responsive to one bit of the 4-bit coded signals for producing an output in accordance with the received bit;

b. decoder means coupled to each of the register means and responsive thereto for producing one of ten output signals in accordance with the outputs received from the register means;

c. a first AND gate coupled to the second and the fourth register means for producing an output in response to the outputs from the second and fourth register means;

d. a second AND gate coupled to the third and fourth register means for producing an output in response to outputs from the third and fourth register means; and e. at least one indicator means for indicating the numerals 0—9 and a point indication, the indicator means responsive to the decoder means and the first and second AND gates whereby each of the 16 possible combinations which can be derived from the 4-bit coded input signal is represented by one numeral of the indicator means or by one numeral and the point indication of the indicator means.

2. A indicating system according to claim 1 wherein the 16 possible combinations represent programmed codes, such as control instructions.

3. An indicating system according to claim 1 further comprising circuit means for activating the point indication, whereby, the indicator means operates as an ordinary decimal number system indicator.

4. An indicating system according to claim 1 further comprising an OR gate coupled to the outputs of the first and second AND gates whereby an output from the OR gate is applied to the point indication of the indicator means whenever either AND gate produces an output.